United States Patent [19]

Dame et al.

[11] Patent Number: 5,768,343
[45] Date of Patent: Jun. 16, 1998

US005768343A

[54] ALARM SYSTEM BACKUP

[76] Inventors: Richard J. Dame, 914 Emerson Ave. -#1, Syracuse, N.Y. 13204-1005; Kenneth A. Immeke, 1A VanDyke Dr. South, Rensselaer, N.Y. 12144

[21] Appl. No.: 710,409

[22] Filed: Sep. 17, 1996

Related U.S. Application Data

[63] Continuation-in-part of Ser. No. 524,424, Sep. 6, 1995.
[51] Int. Cl.⁶ ............................................. H04M 1/24
[52] U.S. Cl. ......................... 379/33; 379/51; 340/540; 340/652
[58] Field of Search ..................... 379/32, 33; 340/540, 341, 652, 426, 501, 573, 825.3

[56] References Cited

U.S. PATENT DOCUMENTS

| | | | |
|---|---|---|---|
| 4,736,196 | 4/1988 | McMahon et al. | 340/573 |
| 4,737,776 | 4/1988 | Wireman | 340/652 |
| 4,945,872 | 8/1990 | Embry | 340/426 |
| 5,440,177 | 8/1995 | Bellin et al. | 340/825.3 |

*Primary Examiner*—Curtis Kuntz
*Assistant Examiner*—Stephen W. Palan
*Attorney, Agent, or Firm*—Schmeiser, Olsen & Watts

[57] ABSTRACT

A security system add-on device is disclosed that provides a false phone line apparatus for tricking an intruder into believing that they have cut the building phone line. The apparatus includes a close loop wire pair that acts as a false phone line and is coupled to a false line cut detector. When the false line is cut, the cut detector signals the security system that a breach of security has occurred.

16 Claims, 4 Drawing Sheets

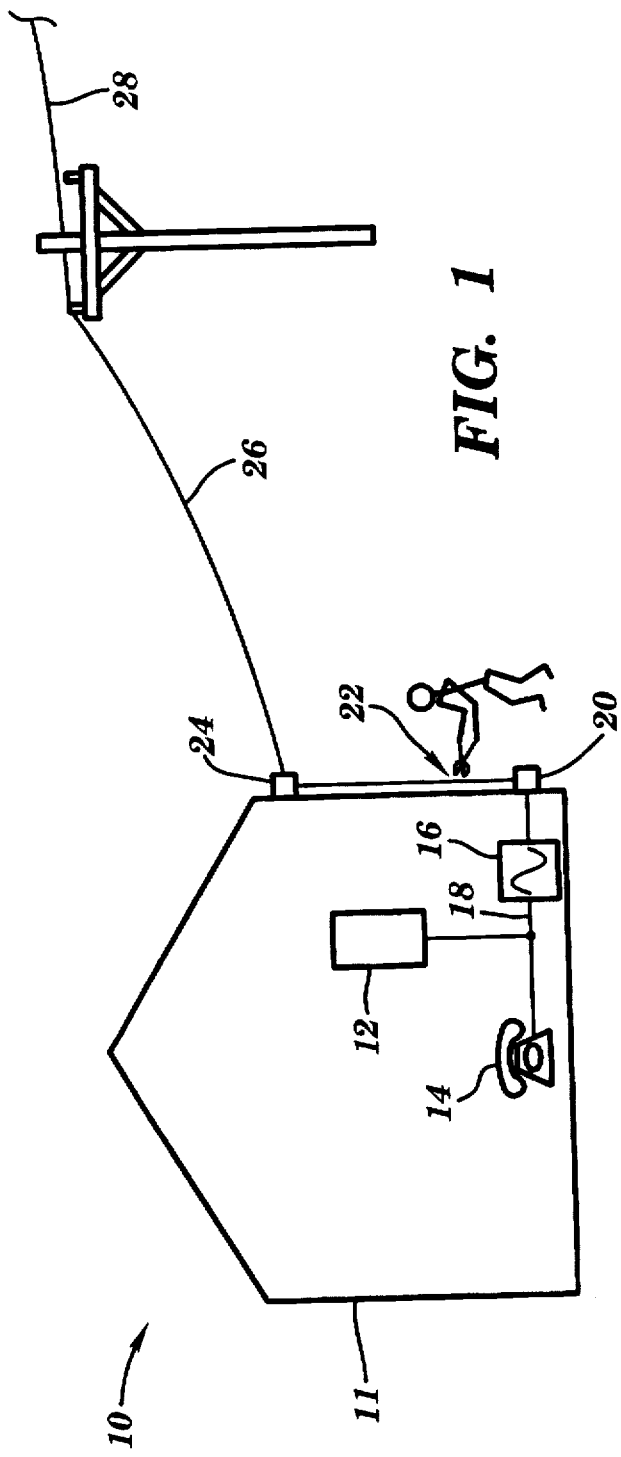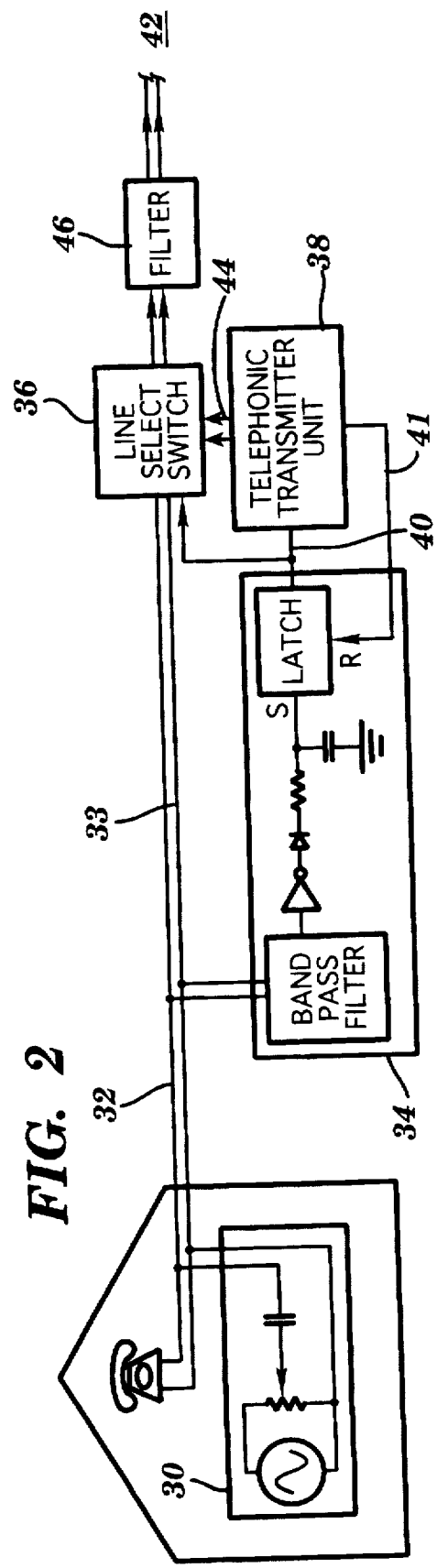

ALARM SYSTEM BACKUP

The present application is a Continuation-In-Part application of application Ser. No. 08/524,424 filed Sep. 6, 1995.

FIELD OF THE INVENTION

The present invention relates generally to alarm systems. In particular, the present invention is concerned with an alarm system add-on device for detecting telephone line severance.

BACKGROUND OF THE INVENTION

Currently, there are numerous alarm systems on the market. Many of these systems operate in conjunction with protective service companies. Generally, these companies act as monitoring stations in the event an alarm is triggered at a remote location. Typically, the alarm system will automatically place a telephone call to a protective service company thereby placing them on notice that a breach of security has occurred. The protective security company then acts appropriately by either sending help or notifying the police.

Unfortunately, the criminal element in today's society has sought ways of undermining this technology. One such way they have done this is to cut the telephone lines going into a building just prior to breaking in. They protective service company is therefore unable to respond since they are unaware of the break in.

In order to avoid this problem, alarm systems have been developed to include alternate or redundant methods of notifying protective service companies. For instance, U.S. Pat. No. 4,361,730 to Barber et al. discloses a system which utilizes interactive cable television lines as a means of reporting a break in.

U.S. Pat. No. 4,731,810 to Watkins discloses a backup security system which utilizes A.C. power lines as a means for transmitting an alarm if the phone lines have been cut.

U.S. Pat. No. 4,465,904 to Gottsegen et al. discloses an alarm system which utilizes a radio transmitter as a backup device in the event of line severance.

Finally U.S. Pat. Nos. 4,887,290 and 5,185,779 to Dop et al. disclose cellular alarm backup systems for use with standard alarm systems in the event the telephone line is severed.

Although each of the above patents attempts to provide a possible solution to the problem, each one has the drawback of being relatively expensive due to the fact that an additional or redundant transmission means is required which utilizes something other than the existing telephone line.

Until now, no system exists to provide an inexpensive solution to protect against a cut telephone line. The present invention seeks to provide this functionality. Each of the above listed patent are hereby incorporated by reference.

SUMMARY OF THE INVENTION

Briefly, in a first embodiment, the present invention provides a backup alarm system that utilizes a signal generator connected to an interior phone line to generate a high frequency signal out to the outdoor telephone line. On the outdoor line, in a discreet location, a signal detection device monitors the signal. If the signal ceases, thereby indicating a break in the line between the signal detection device and the building, a telephonic calling unit located in conjunction with the detection device automatically places a distress call.

The invention may include a line switching device to deselect the house and select the telephonic calling unit. It may also include a line filter placed above the detection device to remove the signal from the telephone lines before it reaches the telephone company service line. In addition, the invention may include a cellular or radio backup device.

In a second embodiment, the present invention provides an add-on device for existing alarm systems. The add-on device includes a false outdoor telephone line for placement on the exterior of a building and a false line cut detector. When the false phone line is cut, the cut is recognized by the false line cut detector and a signal is sent to an alarm control box. In this system, the real phone line is rerouted within the interior of the house, while the fake wire remains exposed. The false line comprises a closed loop line with a shorted circuit at a first end (near the telephone company phone line) so as to appear as a real phone line. A second end is connected to a false line cut detector.

In accordance with the above, it is an object of the present invention to provide a backup alarm system to warn of telephone line severance.

In accordance with the above, it is a further object of the present invention to provide a system which utilizes the severed phone line to place a distress call.

In accordance with the above, it is a further object of the present invention to provide a detection device which can determine whether the phone line has been cut at points near where the outdoor telephone line enters the building.

In accordance with the above, it is a further object of the present invention to provide an inexpensive means for modifying existing alarm systems to include telephone line severance detection.

In accordance with the above, it is a further object of the present invention to provide a system that is easily installable to existing phone lines and alarm systems.

In accordance with the above, it is a further object of the present invention to fool potential intruders into believing they have cut the phone lines.

In accordance with the above, it is a further object of the present invention to provide an add-on device to existing alarm systems.

BRIEF DESCRIPTION OF THE DRAWINGS

These and other advantages of the present invention become more readily apparent upon reading the following detailed description and upon reference to the drawings in which:

FIG. 1 depicts a schematic illustration of a typical application of the present invention;

FIG. 2 depicts a high level schematic of the hardware in accordance with the present invention;

DETAILED DESCRIPTION OF THE PREFERRED EMBODIMENTS

Figure 3:
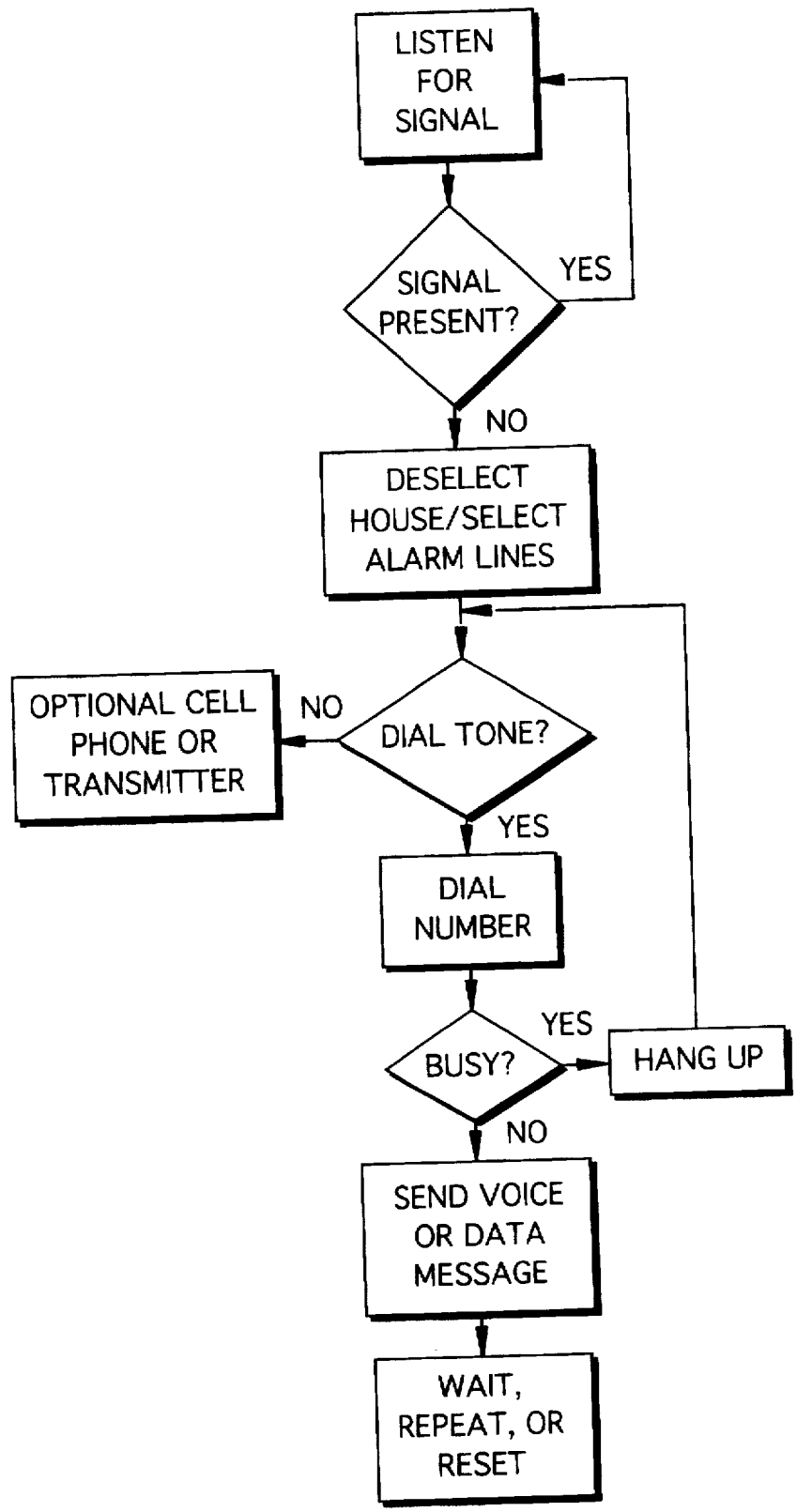
FIG. 3 depicts a logic diagram of a signal detection unit.

Referring now to the drawings and more particularly to FIG. 1, a typical application of how this invention operates is shown 10. Inside of building 11 there exists an interior phone line system 18, at least one telephone 14 and an alarm control and communication unit 12. This is representative of most alarm systems today in that should the unit 12 detect an alarm, a message is transmitted via the phone lines to a protective service company.

The present invention however provides a backup system by adding a signal generator 16 and a signal detection/ telephonic transmission unit 24. Thus, if a burglar Cuts the outdoor phone line 26 at a point 22 near the outdoor terminal block 20 (i.e., the point at which the phone line enters the building), the status signal generated by the signal generator 16 is no longer detected by the signal detection/telephonic transmission unit 24. When this occurs, the signal detection/ telephonic transmission unit automatically dials and transmits a distress call to the protective service company. This can be accomplished since the unit 24 still has access to the telephone company service lines 28 via the unaffected portion of outdoor telephone line 26.

For maximum effectiveness, it is ideal to place unit 24 in a discreet position, preferably as high up as possible so that a potential burglar will not notice it and/or be tempted to cut the phone line before the unit 24. It is also understood that this system could be used in situations where the outdoor phone lines are run underground by placing unit 24 away from the building, perhaps hidden in a bush or the like. Unit 24 may be powered by the phone lines themselves, a battery, or A.C. power.

Referring now to FIG. 2, a high-level hardware schematic diagram is shown. Signal generator 30 is shown inside a building and connected to the interior portion of phone line 33. The signal generator may comprise a signal generation device which generates a continuous status signal ideally at a constant frequency of between 20 and 50 kilohertz. It is understood however that this range may vary depending on the required parameters of the phone system and the present invention. The signal may also comprise any type of signal including a sine wave or a square wave. It is also understood the signal need not be a continuous signal, but may be a pulse type signal. The status signal will ideally have a tone level of approximately 0.1 volts, however any acceptable voltage level may be used.

The signal, once generated, travels outside the house along telephone lines 33. Signal detection device 34 monitors the line 33. As shown, the detection device 34 comprises a bandpass filter to listen specifically for the status signal, an amplifier to boost the signal, a rectifier to convert the signal into D.C., a resistor and a capacitor to hold the charge on the line. An alternative design which utilized an oscillation device, rather than a filter, could also be used to detect the signal. The device 34 also utilizes a latch which will turn on (or off, depending upon the design) line 40 when the status signal is no longer present. This condition will exist when the telephone line 33 has been cut near point 32.

It is also envisioned that signal detection device 34 could also comprise a sensing device which would simultaneously monitor the phone line to detect a short circuit. It could also incorporate a voltage sensor to make certain that phone service from the telephone company service lines was operational. If either of these failure conditions existed, a cellular phone or some other means could be utilized to place the distress call.

Line 40, once turned on, will in turn cause line select switch 36 to deselect the telephone lines going to the building and select telephone lines 44 which lead to a telephonic transmitter unit 38. Line select switch 36 may incorporate a single relay or double relay system to eliminate problems related to short circuits. An RF trap may also be placed on the telephone line near the line switch to remove any unwanted radio frequency noise.

Once the line switch has occurred, telephonic transmitter unit 38 becomes enabled, listens for a dial tone, and then places a call to the desired location (e.g., a protective service company). This call takes place over outdoor line 33 which is connected to the telephone company service lines at 42. Telephonic transmitter 38 may comprise any of the standard electronic phone devices presently known in the art such as those produced by UNISONIC PRODUCTS or YES! ENTERTAINMENT CORPORATION. It may also comprise a data or voice message stored in EPROM or some other storage means. Telephonic transmitter unit 40 may also comprise a backup cellular phone or radio transmitter in the event a dial tone is unavailable.

In addition, a line filter unit 46 is also provided for. This unit will eliminate the status signal created by the signal generator 30 before it reaches the telephone company service lines 42. Furthermore, the filter unit 46 may also comprise a spark gap which will protect the aforementioned hardware from electrical spikes.

Finally, line 41 is provided for to reset the system. This may occur after a call or several calls have been placed, or may be reset manually.

It is recognized that the aforementioned description is only one of many possible ways of implementing this invention. For instance, the detection device 34 may monitor for time spaced pulses rather than a continuous signal. Moreover, the status signal may be sent over one or both of the phone line wire pair. Additionally, the transmitter unit 38 may have the capability of listening for a response after it has transmitted its information so that the system can then react accordingly.

Furthermore, it is also possible to add optional security devices to this invention. For example, indoor panic buttons may be incorporated which utilize the signal generator and detection device. One such method of accomplishing this would be to have the panic button remove the status signal from the phone line, thereby creating the necessary condition for sending a distress call. This could easily be accomplished with the use of a switch and capacitor placed in parallel with the phone line.

Referring now to FIG. 3, a logic diagram is shown which depicts how the signal detection unit 34, the telephonic transmitter 38, and the line select switch 36 of FIG. 2 may operate.

Signal detection device 34 continuously listens for the status signal. As long as the signal is present, the outdoor telephone lines are operable and the system holds in this pattern. If the signal is not present, the line select switch 36 deselects the house telephone lines and selects the alarm telephone lines.

The telephonic transmitter unit 38 then listens for a dial tone. If the tone is not present, the system can optionally switch to a cellular phone or radio transmitter as a means of calling for help. If there is a dial tone, the telephonic transmitter unit 38 dials the appropriate telephone number. If the number is busy, it hangs up and tries again. This will be repeated until the line is no longer busy.

Once a connection has been established, a prerecorded voice or data message is transmitted over the phone lines. After this is done, the system may be set to do a number of things such as wait for a response, repeat the message, or hangup and reset the system.

Figure 4:
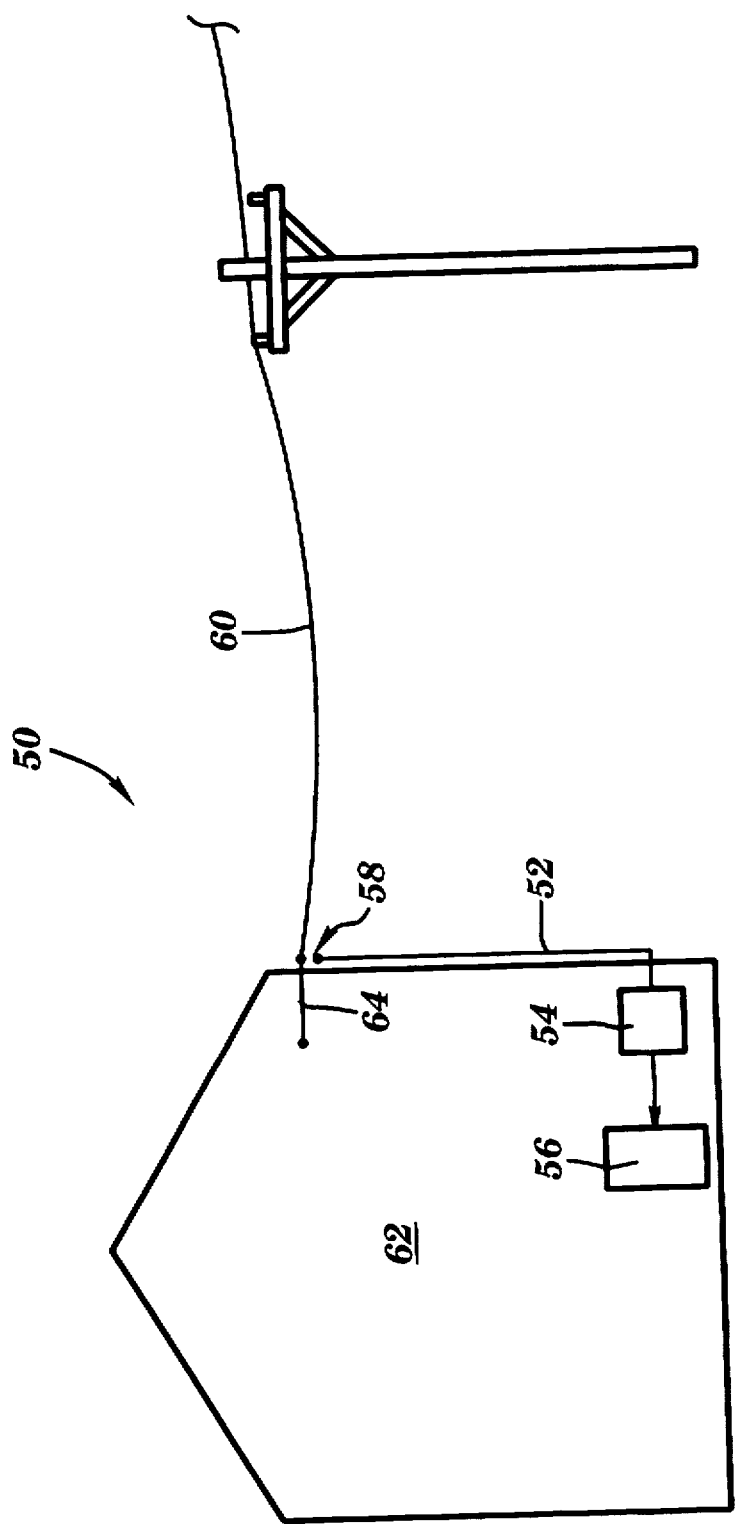
FIG. 4 depicts a schematic illustration of a typical application of a second preferred embodiment of the present invention.

Referring now to FIG. 4, a second embodiment 50 of the present invention is disclosed. Shown is a building 62 with an alarm control system 56. Alarm control system 56 may include any of the widely used commercially available alarm systems. Also shown is telephone company wires 60 which hook up to house 62 at connection point 58. Actual connection to the phone lines 60 are routed directly into the house at point 58 to provide service along line 64. A false phone line 52 is attached onto the exterior of the house 62 to give the impression that it is an actual phone line. The false phone line 58 includes a first end that may terminate near connection point 58, but not actually connect. Thus, no actual phone service is provided over false phone line 52. Instead, line 52 is a closed loop line terminating at its second end. The second end of false phone line 52 terminates in a false line cut detector 54. Detector 54 monitors line 52, and upon being cut, sends an alarm signal to alarm control system 56. Thus, if an intruder cut the false phone line 52 in order to sever phone service to the house, he would actually be signaling the home owners, a protective service agency, or possibly the police, that a breach in security occurred.

An alternative system would be to have two phone line services coming into the building, one through line 64, and one through line 52. (Thus, line 52 would actually be connected to the telephone company lines at connection point 58.) Line 64 would provide the actual phone service to the building, while line 52 would act as a "dummy" phone line. Detector 54 would similarly include a means for detecting a cut in line 52 and means for reporting it to the alarm control system 56.

Figure 5:
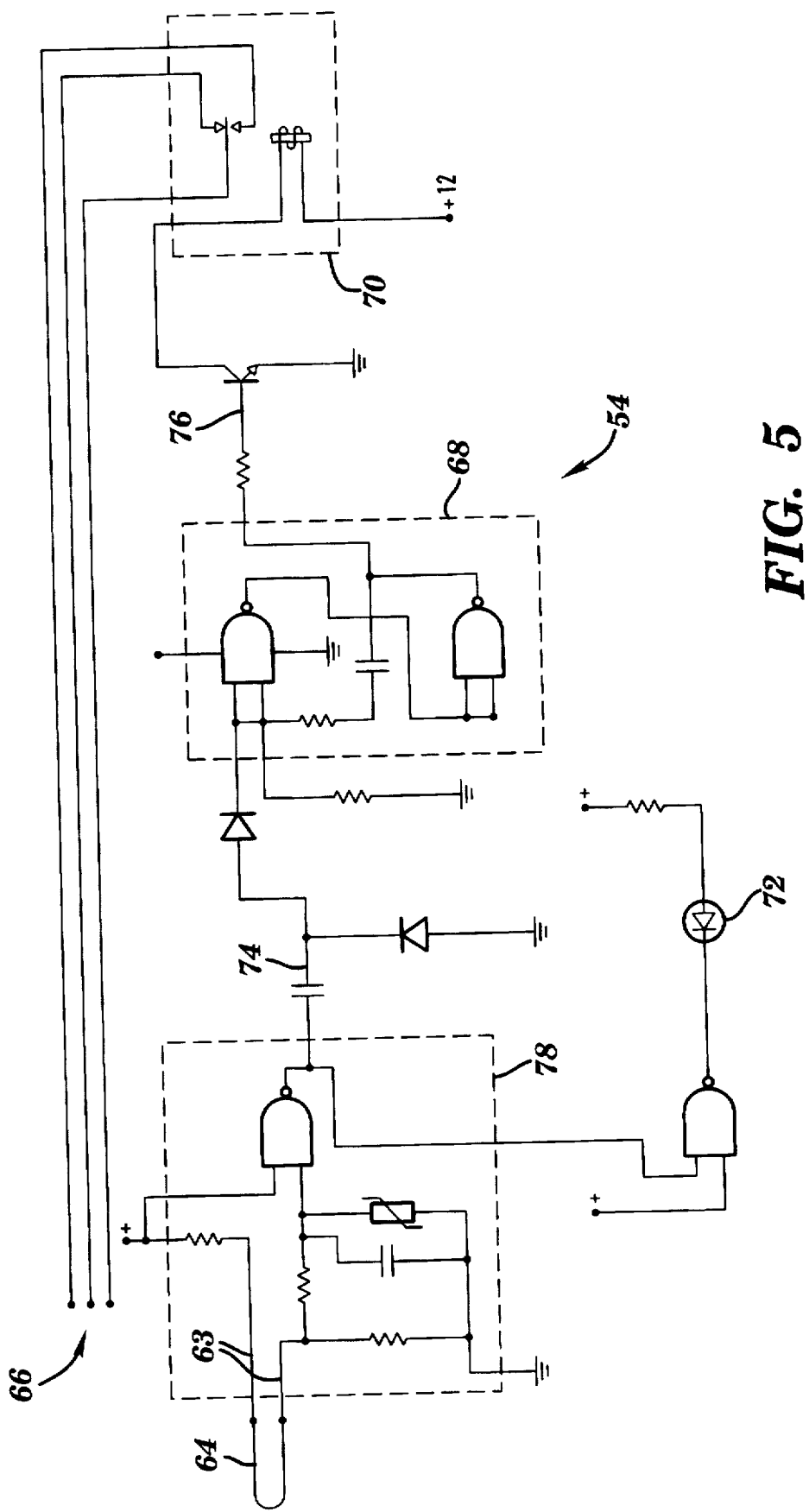
FIG. 5 depicts an electrical schematic of a second preferred embodiment of a false line cut detector in accordance with the present invention.

Referring now to FIG. 5, a false line cut detector 54 is shown. The detector 54 includes a pair of input lines 63 coupled to a closed loop (i.e., false phone line 64) and three output lines 66 for connection to an alarm control system. Detector 54 includes a first circuitry component 78 for monitoring the false phone line 64 and outputting a signal over line 74. The signal output over line 74 will be of a first type (e.g., low) when the false phone line 64 is a closed loop, and of a second type (e.g., high) when the false phone line is severed. Thus, component 78 provides a means for generating and monitoring an electrical signal over false phone line 64. It should be noted that the signal generated over false phone line 64 may be of any type, including one that resembles a real phone signal (to further fool a potential intruder). Component 78 may also include an LED 72 or the light as a status indicator of the false phone line.

A second component 68 is shown that includes a pulse generation device (e.g., a three second "one-shot") which is triggered upon a change in the signal type on line 74. When a pulse is triggered by component 68, it is generated over line 76 and fed into a relay device 70. Relay device 70, in turn, switches on an input to an existing alarm control system via lines 66. The necessary power and ground signals to the detector 54 may be supplied directly by the alarm control system or by any other available means.

The foregoing description of the preferred embodiments of the invention have been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

We claim:

1. An alarm apparatus comprising:
   an alarm control system locatable within a building;
   a telephone wire operationally connecting said alarm control system to a phone company service line located distally away from said building, said telephone wire including a portion that runs through a first entry point of said building;
   a false phone line for entry into said building through a second entry point of said building, wherein said false phone line includes a portion that is visible outside of said building, and wherein said second entry point is distally located away from said first entry point; and
   a false line cut detector having means for recognizing a cut in the false phone line and means for reporting said cut to said alarm control system.

2. The alarm apparatus of claim 1 wherein said false phone line comprises a pair of wires that have a first end electrically connected together and a second end that terminates at the false line cut detector.

3. The alarm apparatus of claim 1 wherein said first end of said false phone line is located near said first entry point outside of said building in order to give the impression that said false phone line is part of said telephone wire.

4. The alarm apparatus of claim 1 wherein said false line cut detector includes means for generating a first signal type when said false phone line is uninterrupted and a second signal type when said false phone line is interrupted.

5. The alarm apparatus of claim 4 wherein said false line cut detector further includes means for generating a pulse in response to a change in an input signal from a first signal type to a second signal type.

6. The alarm apparatus of claim 5 wherein said false line cut detector further includes relay means for receiving said pulse and for signaling said alarm control system in response thereto.

7. The alarm apparatus of claim 1 wherein said alarm control system includes means for notifying an alarm service company via the telephone wire.

8. An add-on apparatus for an existing alarm system, wherein said existing alarm system is operationally connected to a phone company service line via a telephone wire that enters a building at a first entry point said apparatus comprising:
   a false phone line attachable to an outside wall of said building, wherein said false phone line includes a first end for entry into said building through a second entry point of said building, wherein said second entry point is located distally away from said first entry point; and
   a false line cut detector, said false line cut detector having an input that is electrically coupled to said first end of said false phone line and having an output that is operationally compatible with said existing alarm system.

9. The apparatus of claim 8 wherein said false phone line includes a pair of wires electrically connected at a second end.

10. The apparatus of claim 9 wherein said false line cut detector includes means for generating a signal on said false phone line.

11. The apparatus of claim 9 wherein said false line cut detector includes means for determining if said generated signal has been terminated.

12. The apparatus of claim 9 wherein said false line cut detector includes means for notifying said existing alarm system that said generating generated signal has been terminated.

13. The apparatus of claim 8 wherein said false line cut detector includes an LED.

14. A method of installing a false phone line add-on device to an existing building alarm system, said method comprising the steps of:

connecting a first end of a false phone wire to a first point on an exterior of a building near a point where a telephone company service line enters said building;

running said false phone line along an exterior portion of said building;

running said false phone line in through a second point on said exterior of said building distally away from said point where said telephone company service line enters said building;

electrically connecting a second end of said false phone line to a false line cut detector; and electrically coupling said false line cut detector with said existing building alarm system.

15. The method of claim 14 wherein said step of connecting said first end of said false phone wire on said exterior of said building near said point where said telephone company service line enters said building includes the step of disguising the connection to give the false appearance that the connection is operationally coupled to said telephone company service in.

16. The method of claim 15 further including the step of rerouting the telephone company service line into said building at said connection point.

* * * * *